May 4, 1965 R. M. SHERRIE ETAL 3,181,480
LONG TRAVEL CUSHIONED FIFTH WHEEL STAND
Filed March 9, 1959 11 Sheets-Sheet 4

INVENTORS.
Robert M. Sherrie,
William H. Peterson &
By: Jack W. Borger.
Mann, Brown & McWilliams Attys.

May 4, 1965  R. M. SHERRIE ETAL  3,181,480
LONG TRAVEL CUSHIONED FIFTH WHEEL STAND
Filed March 9, 1959  11 Sheets-Sheet 6
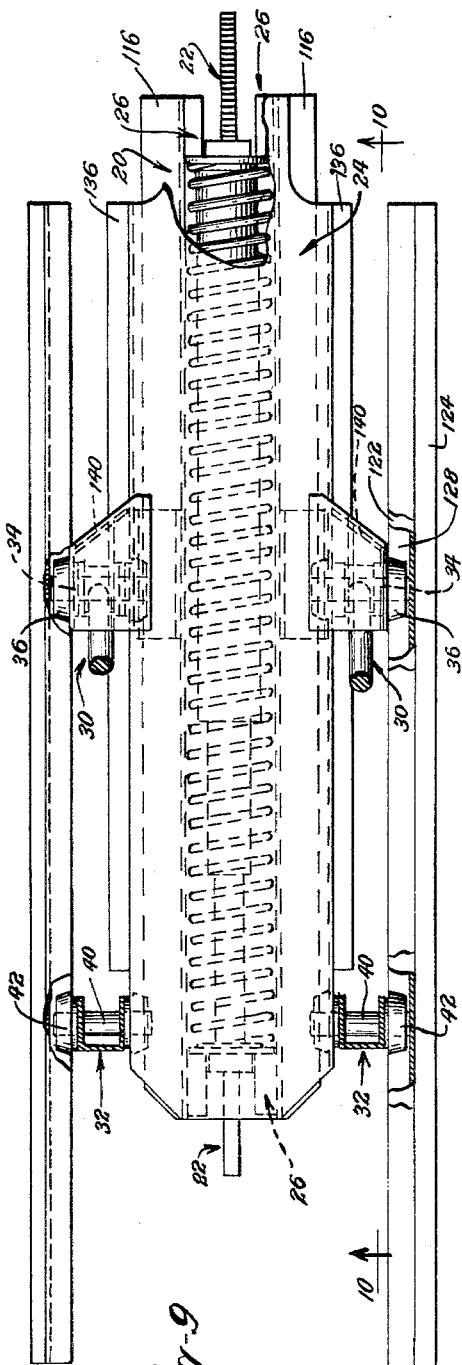
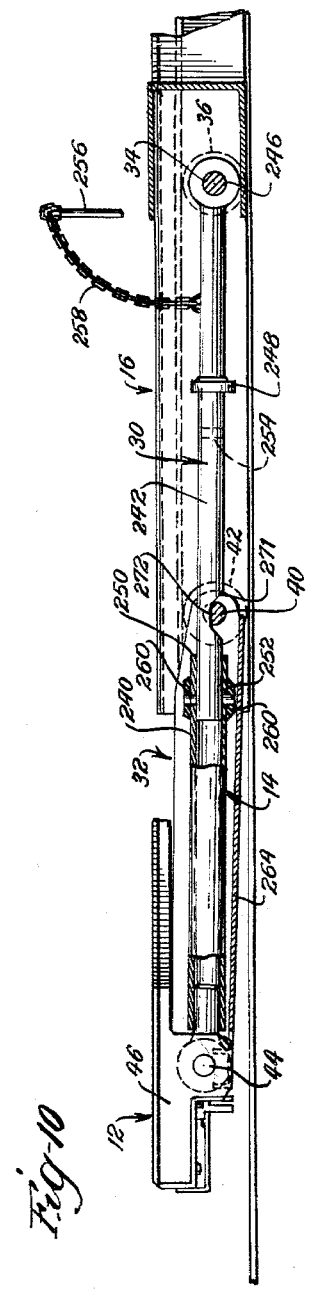
INVENTORS.
Robert M. Sherrie,
William H. Peterson &
By: Jack W. Borger.
Mann, Brown & McWilliams Attys.

May 4, 1965
R. M. SHERRIE ETAL
3,181,480
LONG TRAVEL CUSHIONED FIFTH WHEEL STAND
Filed March 9, 1959
11 Sheets-Sheet 7
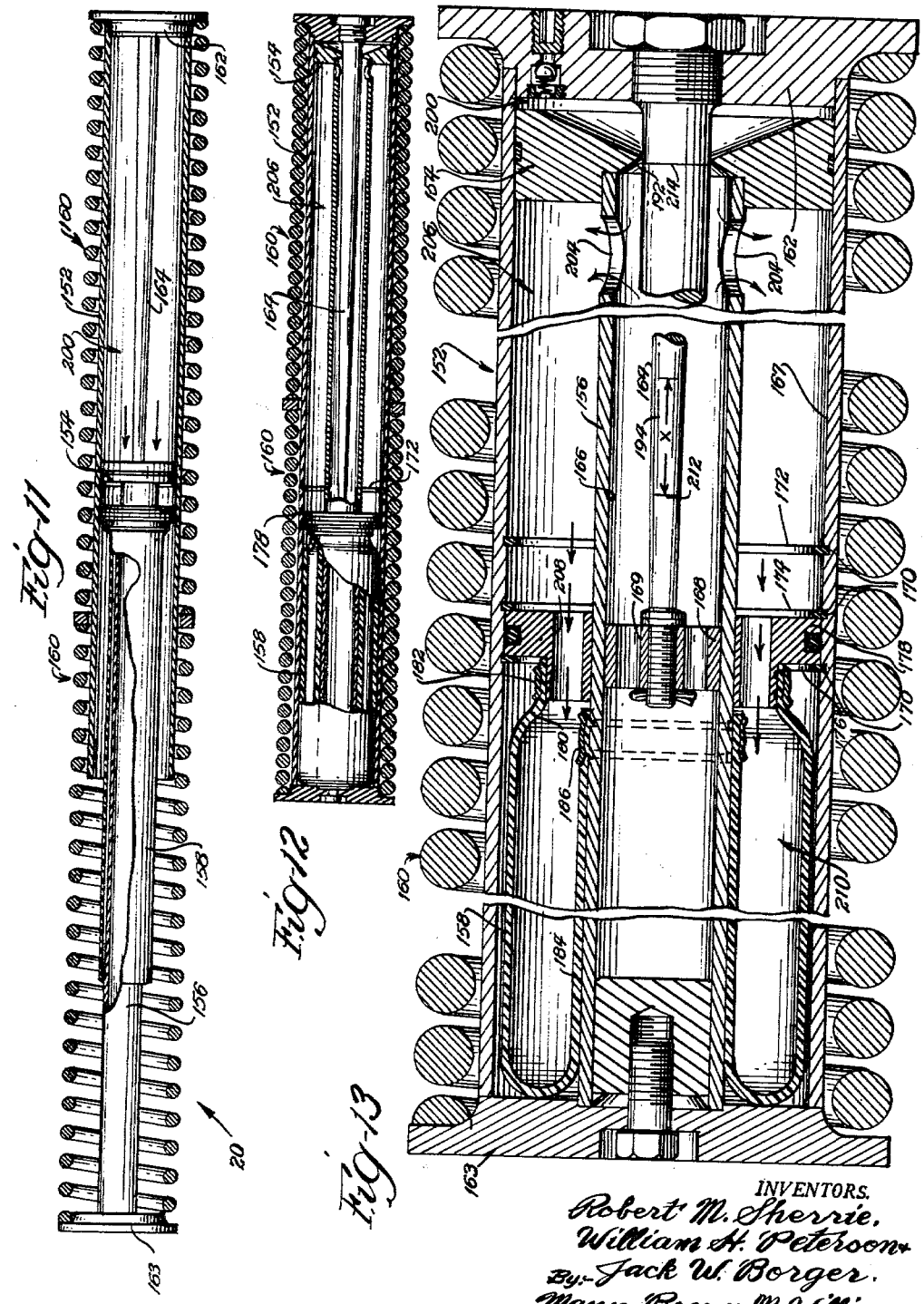
INVENTORS.
Robert M. Sherrie,
William H. Peterson,
By: Jack W. Borger.
Mann, Brown & McWilliams
Attys.

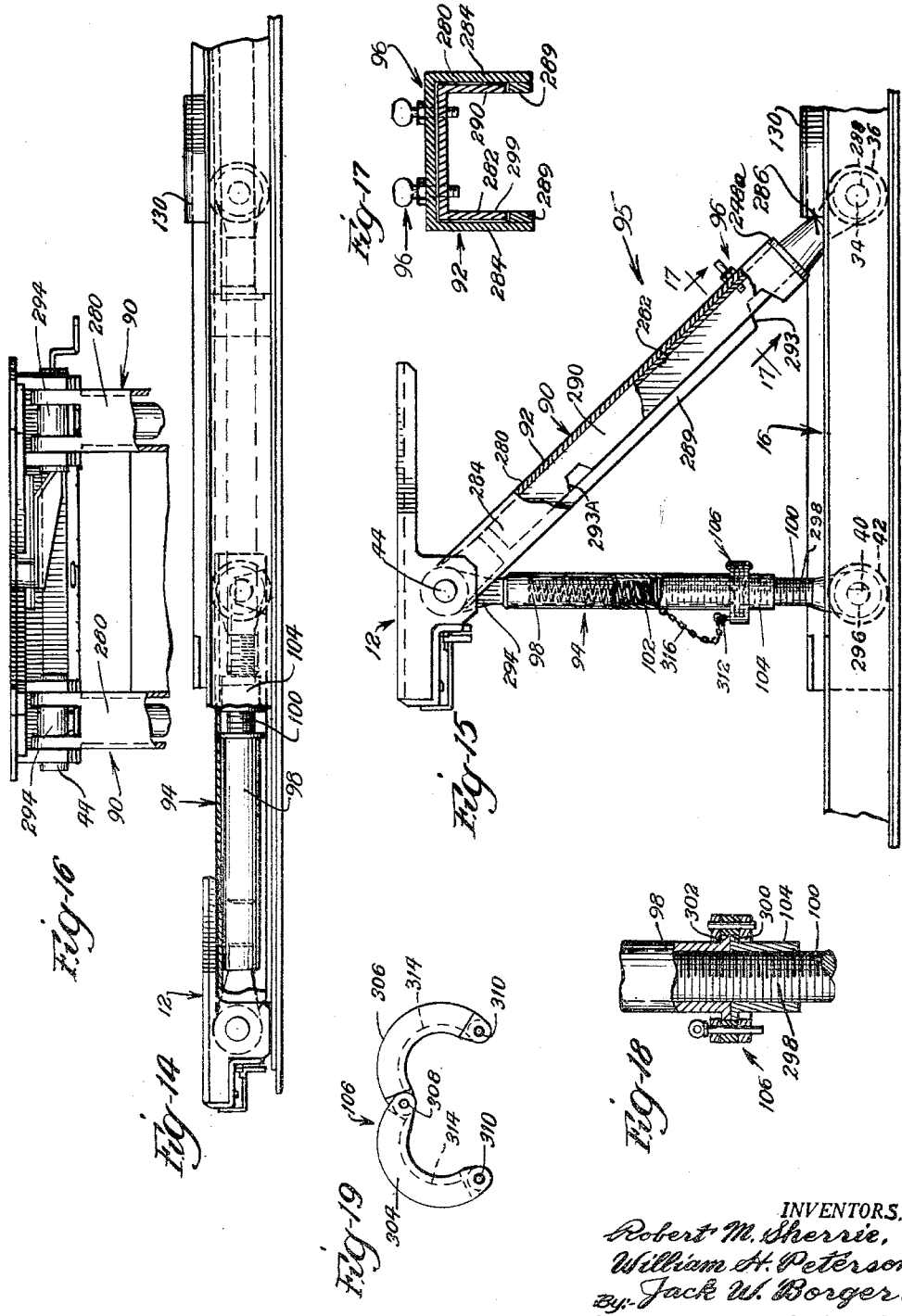

May 4, 1965 R. M. SHERRIE ETAL 3,181,480
LONG TRAVEL CUSHIONED FIFTH WHEEL STAND
Filed March 9, 1959 11 Sheets-Sheet 9

INVENTORS.
Robert M. Sherrie,
William H. Peterson &
By Jack W. Borger.
Mann, Brown & McWilliams

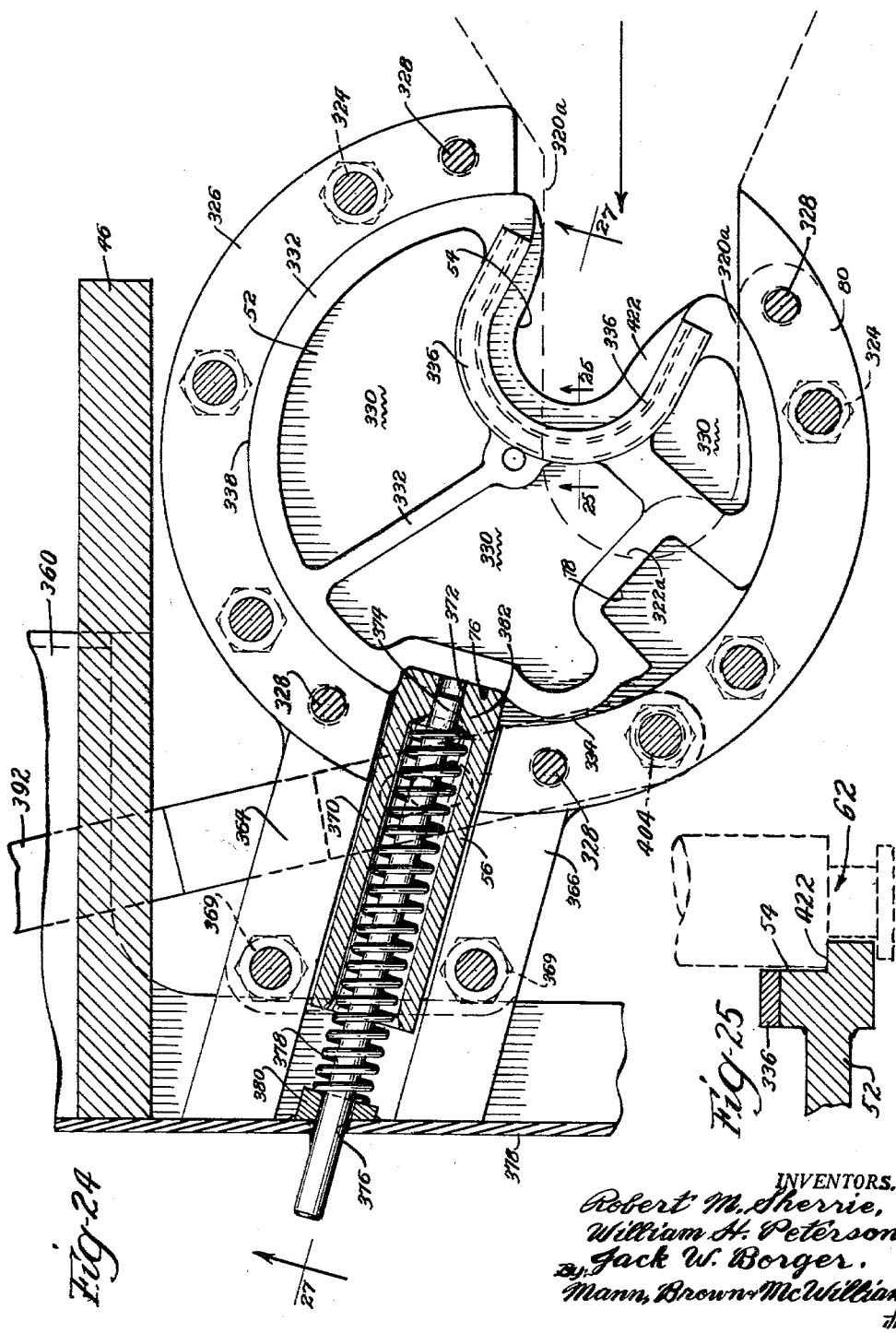

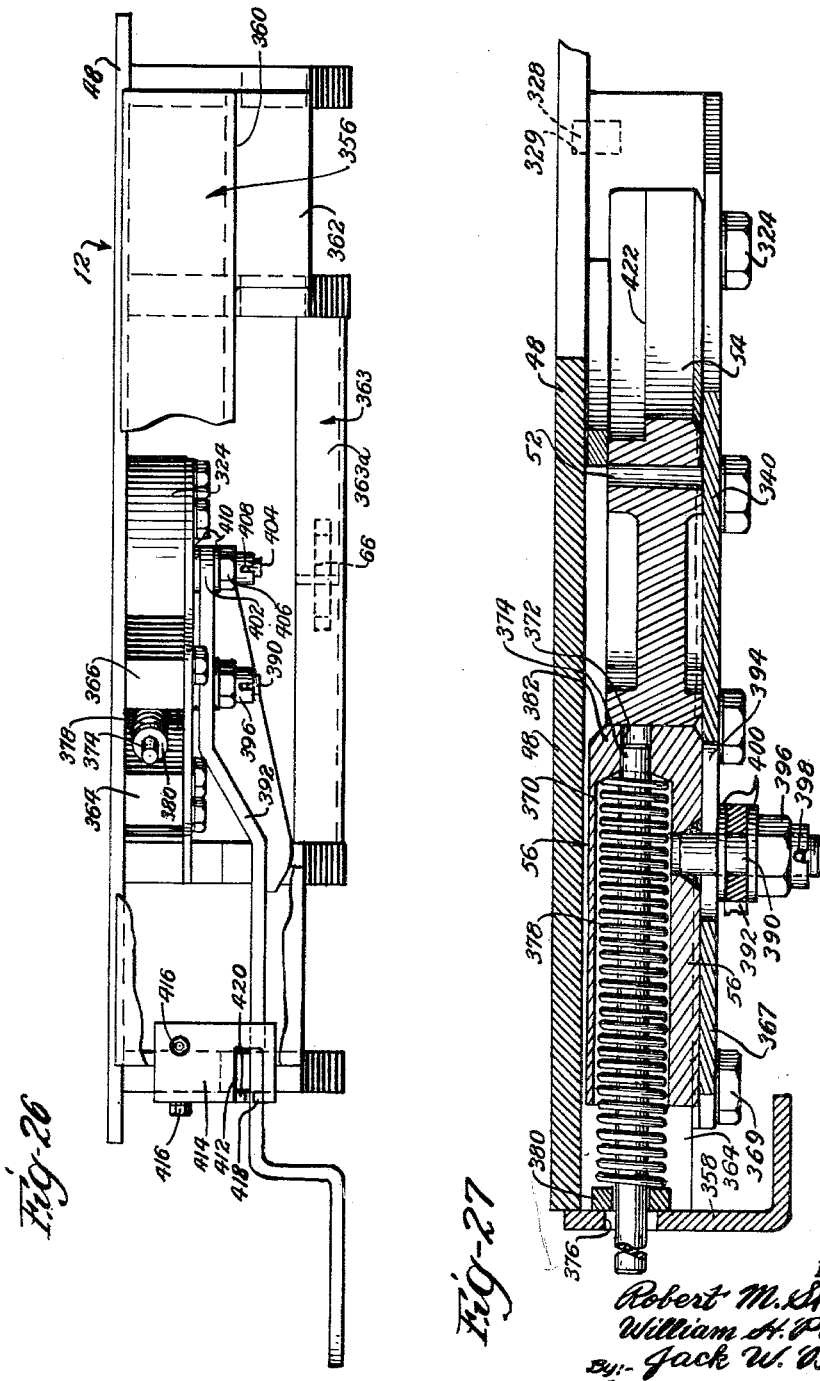

United States Patent Office 3,181,480
Patented May 4, 1965

3,181,480
LONG TRAVEL CUSHIONED FIFTH
WHEEL STAND
Robert M. Sherrie, Lansing, William H. Peterson, Homewood, and Jack W. Borger, Calumet City, Ill., assignors to Pullman Incorporated, a corporation of Delaware
Filed Mar. 9, 1959, Ser. No. 797,989
6 Claims. (Cl. 105—368)

Our invention relates to a fifth wheel stand for use in supporting the front end of a trailer when the latter is carried in railroad transit on a railroad flatcar or a car of similar design.

The so-called piggy back freight handling system or T.O.F.C. (trailer on flatcar) requires the use of a fifth wheel stand at one end of the car to support the front end of the trailer during transit to a given destination. The usual procedure calls for a trailer to be backed onto a flatcar, disconnected from its trailer tractor and temporarily supported on its landing gear, after which the fifth wheel stand is raised from a lowered inoperative position on the floor of the car into locking engagement with the trailer kingpin. The fifth wheel stand, besides engaging the trailer kingpin, also lifts the front end of the trailer sufficiently to elevate the trailer landing gear above the car floor. At the destination, the fifth wheel stand is disconnected from the trailer kingpin and lowered to its inoperative position, the trailer temporarily resting on its landing gear until it is connected to another truck tractor for delivery to an ultimate destination.

Conventional fifth wheel stands employed in this practice are ordinarily self-actuated, that is, they include some power unit, such as a hydraulic or screw type jack, which is employed to move the stand between its elevated operative position and its lowered inoperative position. Furthermore, since the fifth wheel stand must have an inoperative position that is substantially flush with a floor of a car to enable the trailer to be moved over it, and since the stand must also be capable of lifting and supporting 30,000 pounds or more, the stand must include a strong supporting structure that makes provision for a leverage arrangement to enable the jack employed to effectively actuate the stand. The result is that fifth wheel stands have tended to take the form of heavy structures employing leverage arrangements that permit leverage changes to supply the varying mechanical advantages necessary during the raising and lowering of the stand. The foregoing, in addition to the fact that some cushioning arrangement must be employed in connection with the stand, has meant that conventional fifth wheel stands have tended to be relatively complicated in design, expensive to manufacture and maintain, difficult for the average employee to operate, and subject to frequent breakdowns while in service.

Furthermore, it has been found that the various cushioning arrangements of conventional fifth wheel stands are generally unsatisfactory as they fail to provide any significant decrease in lading damage during transit on the car. All railroad cars are subject to buff and draft forces during transit, and when the cars are humped at classification yards, the buff forces may be quite severe. This lading damage presents one of the principal problems in the railroad industry today because of the large number of claims that must be paid. Most of these claims can be attributed to the damage caused by impact forces that the lading has been subjected to while on the railroad car, and experience shows that this lading damage is just as likely to occur in piggy back service as well as when lading is transported in boxcars.

A principal object of our invention is to provide a simplified, comparatively lightweight fifth wheel stand that is adapted to be raised and lowered by using the motive power of the truck tractor, thus eliminating the need for an expensive jack device and leverage arrangement to raise and lower the fifth wheel stand.

A further principal object of the invention is to provide a fifth wheel stand having a cushioning arrangement which not only enables all buff and draft forces to be absorbed in horizontal planes, but which has sufficient travel to effect a sharp drop in forces acting on lading that cause lading damage.

Still other objects of the invention are to provide a fifth wheel stand which indexes the trailer kingpin longitudinally and laterally of the car with practical allowances for variation in location of the kingpin with respect to the stand; to provide an improved kingpin latching device for fifth wheel stands; to provide a fifth wheel stand structure that is adjustable in "reach" so that trailers of varying height may be accommodated by the stand, to provide a stand that includes a cushioning arrangement which transfers and dissipates substantially all kinetic energy applied to the stand by buff and draft forces, rather than storing such energy and returning it in the form of oscillations; and to provide a stand that is inexpensive of manufacture, convenient in use, and readily adapted to all railroad and other freight handling systems requiring a fifth wheel stand or its equivalent.

Other objects, uses and advantages will be obvious or become apparent from a consideration of the following detailed description and the application drawings.

In the drawings:

FIGURE 9 is a cross-sectional view approximately along line 9—9 of FIGURE 6;

FIGURE 10 is a side elevational view of the structure shown in FIGURE 6, but illustrating how it appears in its lowered inoperative position, parts being in section substantially along line 10—10 of FIGURE 9;

FIGURE 11 is a diagrammatic longitudinal cross-sectional view through the hydraulic cushion device employed in our fifth wheel stand showing the device in its extended position;

FIGURE 12 is a view similar to that of FIGURE 11, but showing the cushion device in its fully contracted position;

FIGURE 13 is a view smaller to that of FIGURE 12, but on an enlarged scale and with parts broken away to facilitate illustration;

FIGURE 14 is a side elevational view of a modified form of fifth wheel stand in its lowered inoperative position;

FIGURE 15 is a side elevational view of the stand of FIGURE 14 in its elevated operative position;

FIGURE 16 is a fragmental end elevational view of the upper portion of the device as shown in FIGURE 15 taken from the right hand side of FIGURE 15;

FIGURE 17 is a diagrammatic cross-sectional view along line 17—17 of FIGURE 15;

FIGURE 18 is a diagrammatic cross-sectional view through a portion of one of the struts of the device shown in FIGURE 15;

FIGURE 19 is a diagrammatic plan view of a strut coupling device employed in the device of FIGURE 15;

FIGURE 24 is an enlarged plan view of the fifth wheel stand coupler jaw and associated structures, parts being shown in section;

FIGURE 25 is a fragmental cross-sectional view along line 25—25 of FIGURE 24;

FIGURE 26 is an end elevational view of the fifth wheel plate structure shown in FIGURE 20 on an enlarged scale and taken from the left hand side of this figure; and FIGURE 27 is a diagrammatic cross-sectional view along line 27—27 of FIGURE 24.

It should be understood that the specific disclosure which follows is for the purpose of complying with Section 112 of Title 35 of the U.S. Code, and that the appended claims are to be construed as broadly as the prior art will permit consistent with the disclosure herein made.

General description

Figure 1:
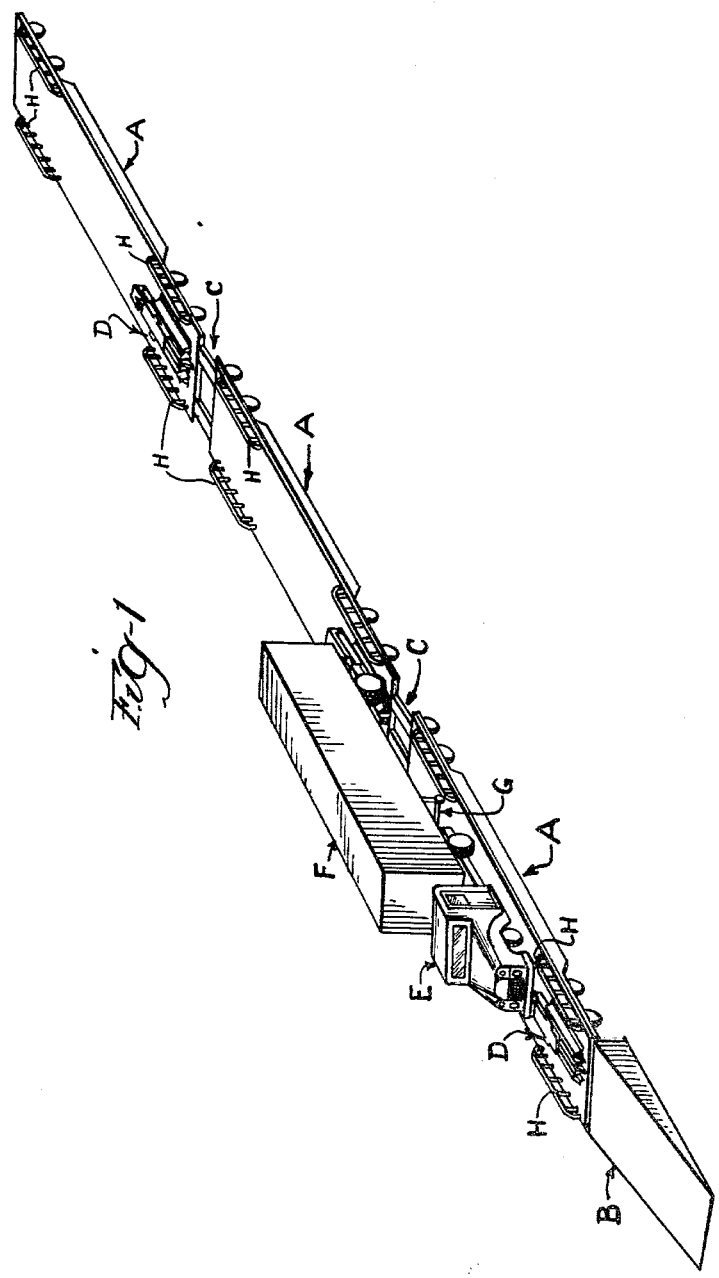
FIGURE 1 is a diagrammatic perspective view showing several railroad flatcars being loaded in accordance with usual piggy back practices, illustrating our stand applied thereto.

FIGURE 1 diagrammatically illustrates typical railroad shipping yard facilitates employed in practicing the piggy back freight handling system, which may consist of a single track upon which a number of flatcars are positioned in coupled relation, these cars generally being designated A.

At the end of the track (the rails of which are omitted for simplicity of illustration) is a ramp B, with the car A at the end of the track being positioned closely adjacent the ramp. Subsequent cars are interconnected by retractable sills generally designated C. Each car A that is to be used for piggy back service is provided with a fifth wheel stand D that embodies the principles of our invention.

Conventional piggy back practice is for the truck tractor E with its trailer F to back up the ramp B, and from car to car over the sills C to the last car in the series, whereupon the truck tractor is disconnected from the trailer allowing the front of the trailer to rest on its landing gear G, after which the truck tractor is driven off the cars and the front of the trailer is picked up by the fifth wheel stand D to support the front end of the trailer during travel of the railroad car. Cars A may be provided with suitable guard rails on each side of their front and rear ends to guide the movement of the truck tractor and trailer wheels. A suitable type is indicated at H in FIGURE 5.

Reference numeral 10 of FIGURES 2-6 generally indicates one embodiment of our invention, which generally comprises a fifth wheel plate structure 12, a lift structure 14, and a cushion assembly 16. The cushion assembly 16 is mounted in any suitable manner on the supporting surface 18 of a standard railroad flatcar A and includes a cushion device 20 (see FIGURE 9) that is mounted between spaced lugs 22 fixed to the railroad car.

The cushion assembly 16 includes a traveling housing component 24 to which the lift structure is connected and which carries lugs 26 that are positioned to be engaged by the ends of the hydraulic cushion device 20.

The lift structure 14 generally comprises a pair of extensible and contractible diagonal struts 30 and a pair of rigid vertical struts 32. The struts 30 are secured to the cushion apparatus traveling housing component 24 by shafts 34 (see FIGURES 7 and 9) which journal rollers 36 riding in trackways 38. The struts 32 are secured to the cushion apparatus travelling housing component 24 by shafts 40 which journal rollers 42 that also ride in trackways 38. Shafts 40 are fixed to the respective struts 32 as by welding.

The struts 30 and 32 are pivotally connected to the fifth wheel plate structure 12 by common stud shafts 44 mounted in lugs 46 fixed to the fifth wheel plate structure.

The fifth wheel plate structure (see FIGURE 20) generally comprises a fifth wheel plate 48 formed with kingpin guiding surfaces 50 that converge toward a rotatable coupler jaw 52 which is provided with a kingpin receiving notch 54 and is adapted to be secured against movement by a plunger 56 operated by handle 58.

Figure 2:
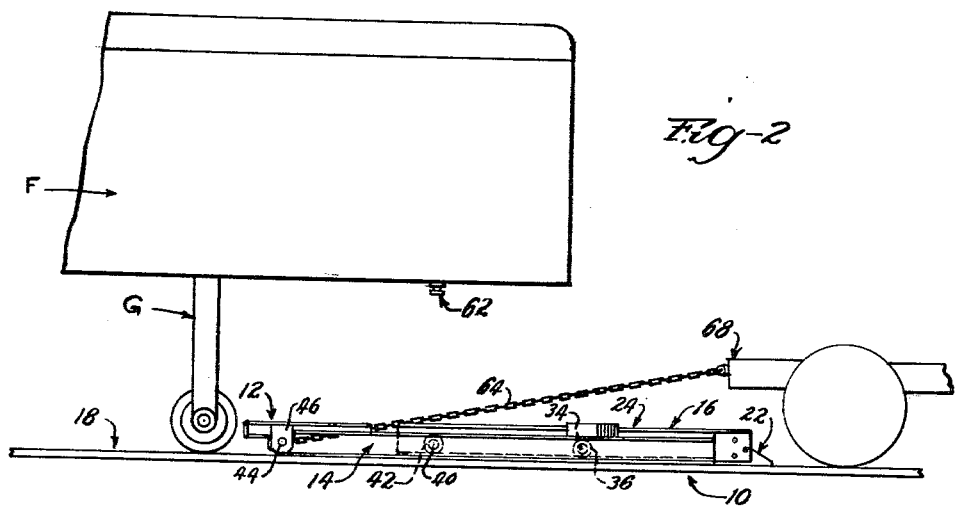
FIGURES 2–4 are diagrammatic side elevational views illustrating the manner in which our fifth wheel stand is applied to the kingpin of a conventional trailer.
Figure 3:
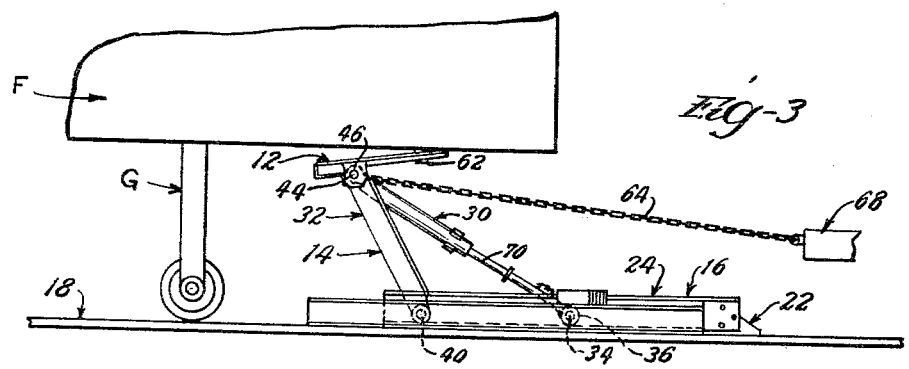
Figure 4:
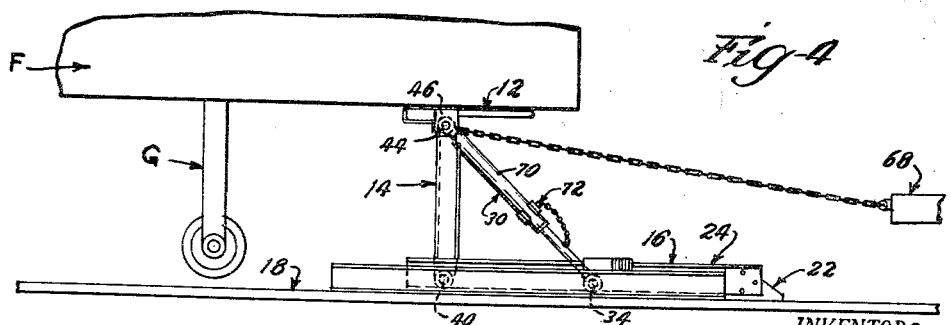

The trailers F are transported on highways by a truck tractor to which they are secured by an appropriate fifth wheel mechanism that grasps kingpin 62 (see FIGURE 2). In utilizing the fifth wheel stand 10, the trailer F is applied to a railroad car A by being backed onto same to the position where the kingpin 62 will be engaged by the fifth wheel plate structure 12 when the stand 10 is raised from its lowered inoperative position of FIGURE 2 to its elevated operative position of FIGURE 4. The truck tractor then lowers the front end of the trailer into landing gear G whereupon the trailer is disconnected and moved a short distance forwardly of the trailer, or to the right of FIGURE 2. A chain 64 or any other suitable connecting device is then connected between bracket 66 (of any suitable type) secured to the fifth wheel plate structure 12 and the rear end 68 of the truck tractor, after which the motive power of the truck tractor is employed to pull the fifth wheel stand 10 from its lower inoperative position to its elevated operating position as indicated as indicated in FIGURES 2-4. The struts 30 are in the form of telescoping members 70 which in the lowered position are fully extended but are contracted as the stand approaches its elevated position of FIGURE 4. The fifth wheel plate structure 12 is swung upwardly from the position of FIGURE 2 to the position of FIGURE 4 about the shafts 40 that connect struts 32 to the cushion apparatus traveling component 24. Struts 30 are then secured in contracted relation by a suitable latch device 72.

Figure 20:
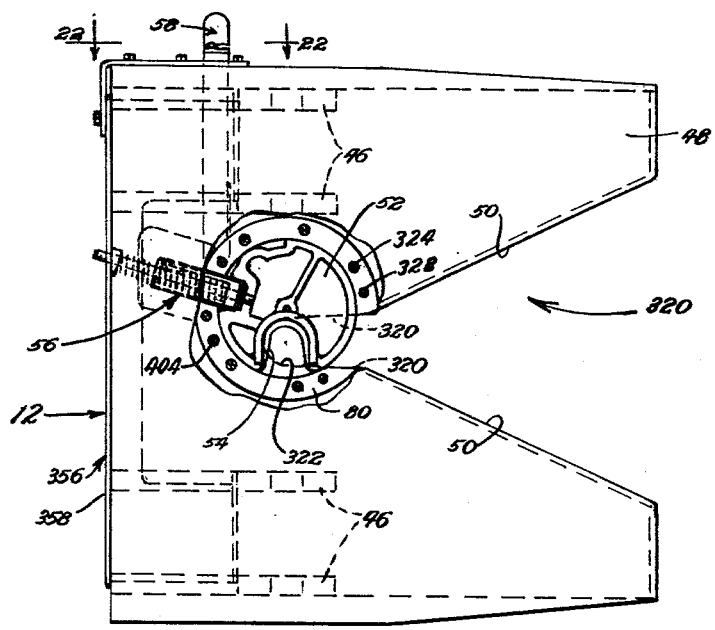
FIGURE 20 is a plan view of the fifth wheel plate structure of the stand shown in FIGURE 6, parts being broken away to facilitate illustration.
Figure 21:
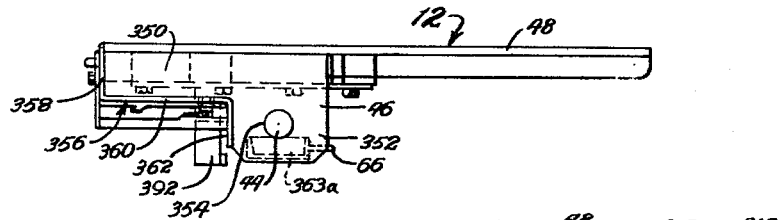
FIGURE 21 is a side elevational view of the fifth wheel plate structure shown in FIGURE 20.

As the stand 10 approaches the position of FIGURE 3 from the position of FIGURE 2, the trailer kingpin 62 is engaged by one of the surfaces 50 and guided toward the notch 54 of coupler jaw 52 which is initially disposed in the position of FIGURE 24. Further elevation of the fifth wheel plate structure 12 causes the kingpin 62 to engage within notch 54 and move coupler jaw 52 to the position of FIGURE 20 which causes plunger 56 to move from notch 76 to its notch 78 and lock the coupler jaw in the position of FIGURE 20, wherein the notch 54 is closed by an abutment member 80 fixed to the fifth wheel plate 48. As best seen in FIGURE 21, bracket 66 is below the axes of shafts 44 so that the force applied to fifth wheel plate structure 12 through chain 64 holds structure 12 substantially in the position shown in FIGURE 3 until it contacts the under surface of trailer F.

The final elevating action on the fifth wheel stand effects a lifting of the front end of the trailer off its landing gear G as indicated in FIGURE 4. The chain 64 is then removed and truck tractor E driven off the series of cars.

During transit, the trailer F as secured to the railroad car is cushioned against buff and draft forces by cushioning apparatus 16, which in the illustrated embodiment is designed to provide a cushioned travel on the order of thirty inches and to transfer and dissipate substantially all kinetic energy that is applied to the fifth wheel stand due to buff and draft forces in accordance with the teachings of William H. Peterson Patent 3,003,436, granted October 10, 1961, on application Serial No. 856,963, filed December 3, 1959, as a continuation in part of the application Serial No. 797,529 (filed March 5, 1959) that is referred to hereinafter. Furthermore, the cushion apparatus 16 provides a substantially constant force travel characteristic in transferring and dissipating buff and draft forces, as disclosed hereinafter and in said patent. The flatcars A may be provided with any suitable means for guiding the movement of the trailer F with respect to the car during this cushioning action and, of course, the holding action of the fifth wheel stand may be supplemented by appropriate tiedown devices.

When the destination of the railroad car is reached, a truck tractor is backed to the front of the trailer F and a chain 64 secured between the bracket 66 carried by the fifth wheel plate structure and the rear end of the truck tractor. Latching devices 72 are then removed from struts 30, and landing gear G, which ordinarily includes some form of jack device for raising or lowering the landing gear with respect to the trailer, are lowered to take a substantial portion of the weight of the front end of the trailer off of the fifth wheel stand. After plunger 56 is withdrawn from coupler jaw notch 78, the fifth wheel plate structure is pushed to the left of FIGURE 4 to start its lowering action after which it is lowered to the fully inoperative position by slowly backing tractor 68 toward the front end of the trailer until the fifth wheel plate structure rests on the bed of the flatcar. Chain 64 is then removed and the trailer F connected to the truck tractor E in the usual manner after which the trailer F is driven from the railroad car.

In the embodiment 95 of FIGURES 14–19, a modified form of lift structure 90 is employed including a pair of extensible diagonal strut forming members 92 and a pair of extensible vertical strut forming members 94. Members 92 function in substantially the same way as members 70 of the embodiment of FIGURE 6, appropriate latching devices 96 being employed to secure members 92 in contracted relation.

The members 94 comprise an upper tubular member 98 which telescopingly receives a lower member 100, a compression spring 102 being interposed between these members of each strut 94. The struts 94 are held in extended relation by springs 102 and this extended relation is preferably made such that the fifth wheel plate structure 12 will be positioned sufficiently high, as it is raised from the position of FIGURE 2 to the position of FIGURE 3, to engage kingpin 62 of trailers standing at the varying standard heights above the railroad car bed. After the stand 95 of FIGURES 14–19 is raised into contact with the undersurface of the trailer (the position of FIGURE 3), a flanged nut 104 (see FIGURE 18) carried by each strut 94 is turned up against the lower end of the member 98 and clamping device 106 applied thereto to hold the struts 94 in this position. The lifting action is then completed and latching devices 96 applied to struts 90 to secure the stand 95 for transit. When the destination is reached, latching devices 96 and 106 are disconnected and the stand 95 lowered as described above.

*Cushion apparatus*

The cushion assembly 16 comprises traveling housing component 24, trackways 38 and hydraulic cushion device 20.

Figure 7:
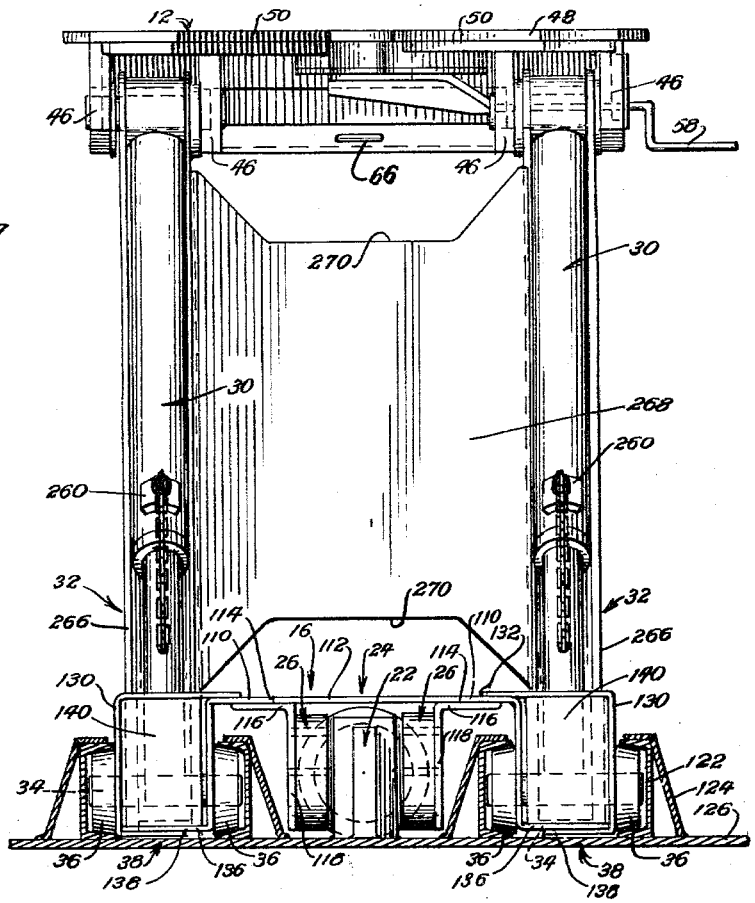
FIGURE 7 is an elevational view partially in section and taken from the right hand side of FIGURE 6.
Figure 8:
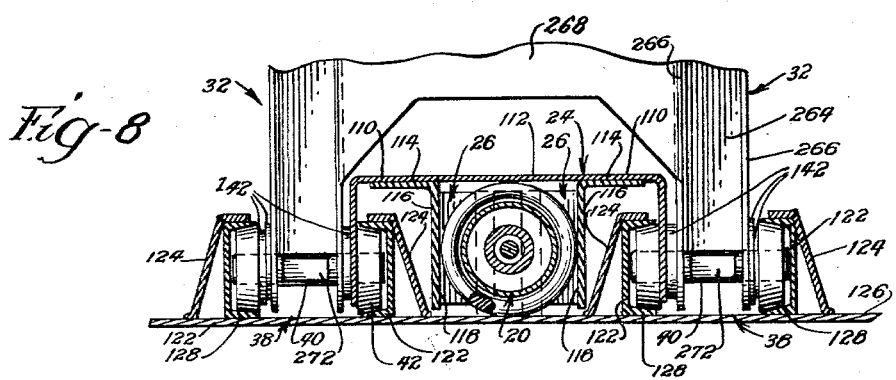
FIGURE 8 is a fragmental cross-sectional view along line 8—8 of FIGURE 6.

As seen in FIGURES 7 and 8, the traveling housing component 24 comprises a pair of substantially Z-shaped members 110 fixed to each side of a central sheet member 112 as by welding at 114. The shafts 34 and 40 pass through suitable perforations formed in the members 110. The housing component 24 carries a pair of spaced angle members 116 that extend longitudinally of the railroad car and between which the cushion device is mounted. The lugs 26 are fixed to the depending flanges 118 of angle members 116 as by suitable bolts 120.

Trackways 38 each comprise a pair of spaced channels 122 supported by appropriate brace plates 124 both of which may be welded to the railroad car bed and to each other; bed 18 in the embodiment shown is provided with a base plate 126. The rollers 36 and 42 ride on the lower flanges 128 of the respective channel members 122.

Figure 5:
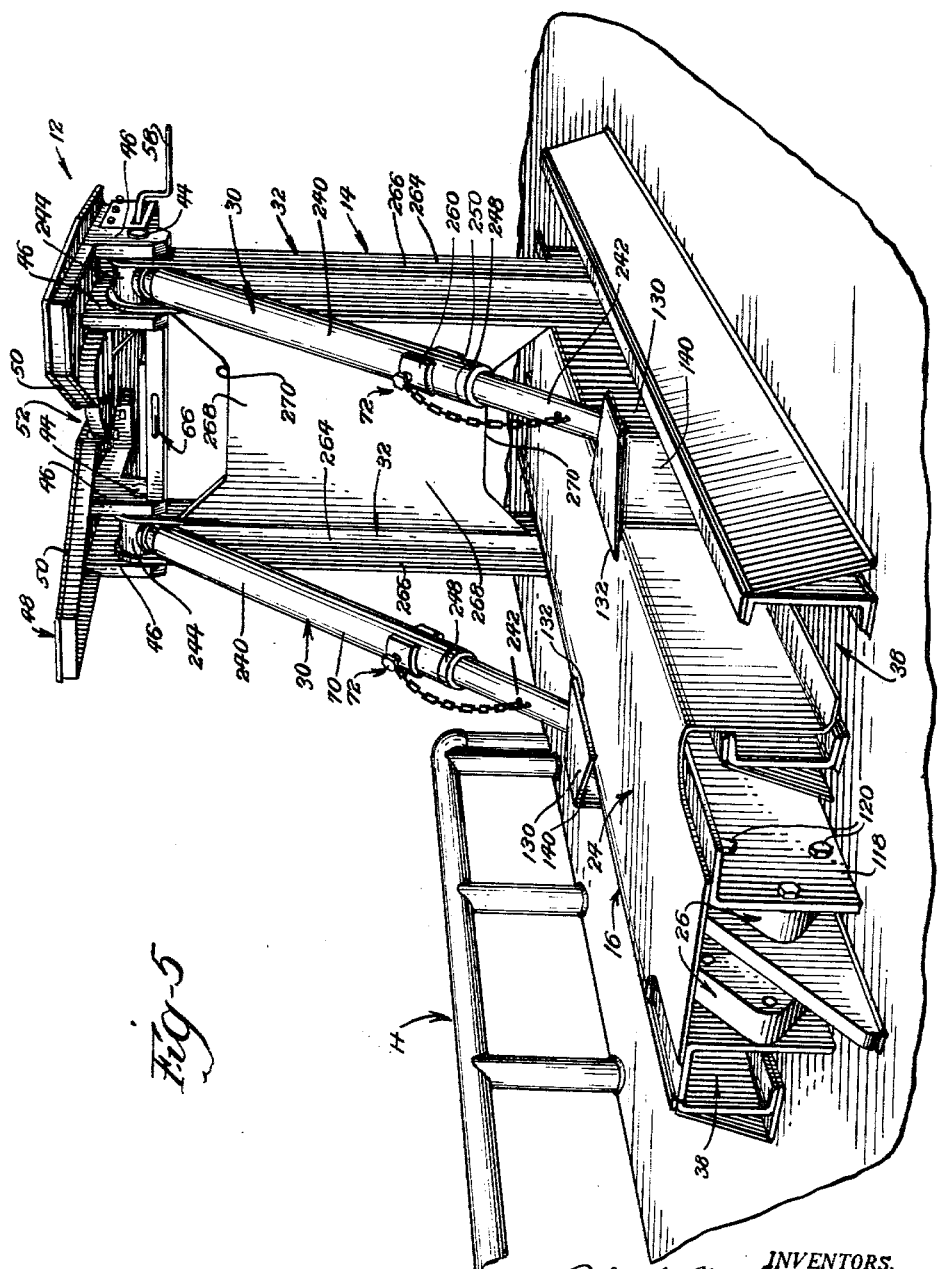
FIGURE 5 is a perspective view of one embodiment of our invention shown applied to a railroad car bed in its elevated, operative position.
Figure 6:
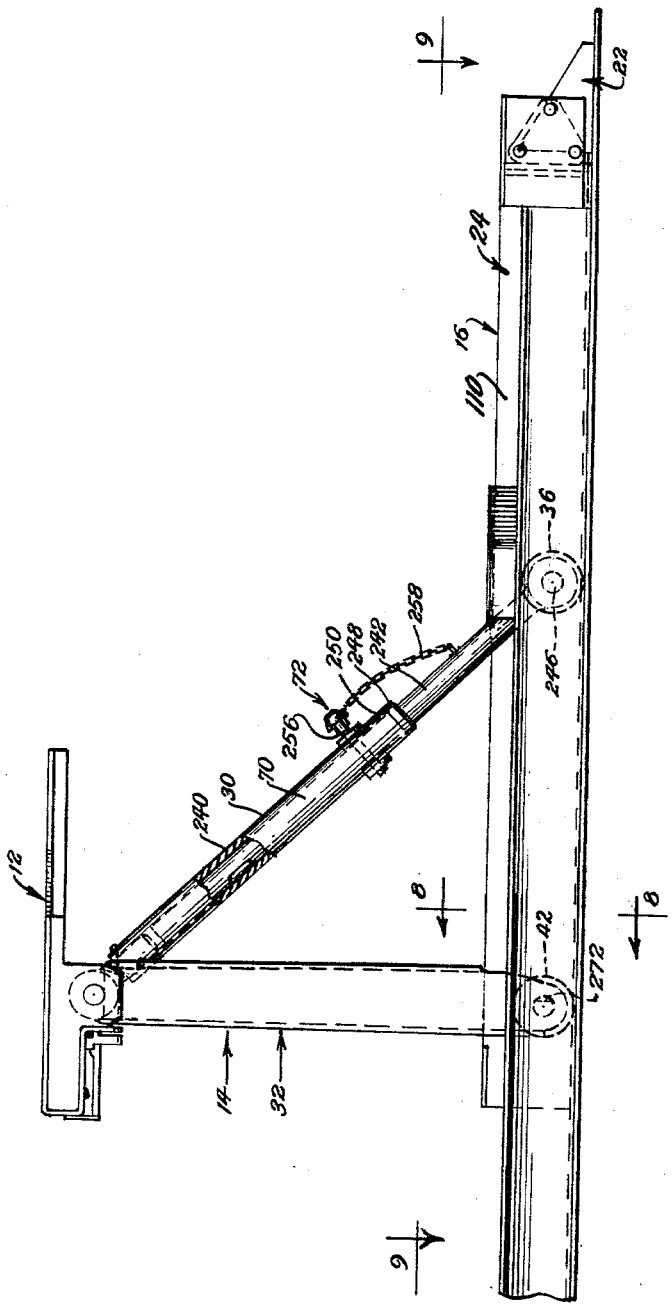
FIGURE 6 is a side elevational view of the fifth wheel stand structure shown in FIGURE 5.

As seen in FIGURES 5 and 7, a generally U-shaped brace plate 130 is fixed to the upper surface of the traveling component as by welding at 132 and is joined to the lower flange 136 of the respective Z-shaped members 110 as by welding at 138. The respective brace plates 130 receive shafts 34 and serve to effect a restraining action on said shafts to keep rollers 36 aligned with trackways 38. A further brace plate 140 welded between the brace plate 130 and the respective Z-shaped members 110 reinforces the brace plates 130.

The rollers 36 and 42 may be provided with appropriate spacers 142 to maintain their proper positioning with respect to channel members 122.

The hydraulic unit 20 is preferably that described in copending application of William H. Peterson, Serial No. 782,786, filed December 24, 1958, now Patent No. 3,035,027, granted May 22, 1962, the entire disclosure of which is hereby incorporated by this reference. This unit 20 permits the concepts described in the application of William H. Peterson, Serial No. 797,529, filed March 5, 1959 (the disclosure of which is hereby incorporated by reference), regarding the protection of lading to be incorporated in our fifth wheel stand to achieve the results described in application Serial No. 797,529, the basic features of which are covered by said Peterson Patent 3,003,436.

As described in application Serial No. 797,529 and Peterson Patent 3,003,436, when the shock of impact (as from buff or draft forces) is absorbed by a cushioning mechanism having a length of travel far in excess of the travel length customarily used, lading damages may be materially reduced if not eliminated altogether. The invention described in application Serial No. 797,529 and Peterson Patent 3,003,436 contemplates the use of a long travel cushioning device 20 which has a substantially constant force travel characteristic over its operating stroke. The operating stroke may be a distance in the range of from about twenty to about forty inches, though about thirty inches is preferred. When a cushioning device having travel on the order of cushion device 20 is employed, lading forces (forces that cause lading damage) are kept below dangerous peaks on impacts.

The device 20 operates to transfer and dissipate substantially all kinetic energy imposed upon the fifth wheel stand by buff and draft forces (in excess of the minor amounts absorbed by the return springs of device 20), and the portion thereof that is dissipated is dissipated in the form of heat; this is to be distinguished from spring type cushioning devices that merely store the energy at impact and return it in the form of oscillations. By employing the device 20, the time required for the transfer of the momentum of, for instance, a striking car to a struck car (carrying the lading in question) is prolonged sufficiently to enable the lading to be compacted before the struck car reaches its ultimate velocity, and when a cushion travel on the order of that called for by said application Serial No. 797,529 and Peterson Patent 3,003,436 is provided for, lading forces may be kept at safe limits. This is particularly important in transporting commodities in fiber boxes and other containers (described as resilient lading in said application Serial No. 797,529) which are very susceptible to damage on impacts and form the basis of the large proportion of lading damage claims against U.S. railroads.

Device 20 generally comprises a tubular cylinder 152 in which a piston head 154 is reciprocably mounted, a tubular piston rod 156 fixed to the piston head 154, an invaginating tubular member or boot 158 connected between the tubular cylinder 152 and the tubular piston rod 156, and helical compression springs 160 extending between the closure members 162 and 163 of the tubular cylinder 152 and tubular piston rod 156, respectively.

The closure member 162 of tubular cylinder 152 carries a metering pin 164 that is reciprocably received within the bore 166 of the tubular piston rod 156. The metering pin 164 preferably is provided with a guide member 168 (see FIGURE 13) at its projecting end.

The internal surface 167 of tubular cylinder 152 is formed in any suitable manner as at 170 to receive three snap rings 172, 174 and 176. The snap ring 172 serves as a stop for piston head 154 when the device is in its extended position of FIGURE 1, while the snap rings 174 and 176 hold in place a piston rod guide member 178 to which one end 180 of the invaginating boot or tubular member 158 is secured by a suitable clamp 182. The other end of boot 158 is turned outside in, and is secured to the external surface 184 of the piston rod 156 by a suitable clamp 186.

The device 20 is charged with hydraulic liquid as described in said copending application to completely fill the space defined by the tubular cylinder 152, the tubular piston rod 156 and the invaginating boot 158. When the device is in use, the normal positioning of the device components is that shown in FIGURES 9 and 11, the device being mounted between abutments 22. When the railroad car receives a shock in either buff or draft, either the tubular cylinder 152 will commence movement to the left of FIGURES 9 and 11 or the tubular piston rod 156 and piston head 154 will commence movement to the right of FIGURES 9 and 11, or possibly both movements may occur. In any event, as the device 20 retracts under the force being cushioned, the metering pin 164 displaces hydraulic liquid contained within the tubular piston rod 156 and the piston head 154 causes a hydraulic liquid flow through its orifice 192 through which the metering pin 164 extends. The metering pin is preferably provided with a tapered surface 194 that is designed to provide the aforementioned constant force travel characteristic as the hydraulic cushion contracts under the shock imposed upon it; that is, the arrangement is such that for every unit of travel, the cushioning device provides a substantially constant cushioning effect.

As indicated in FIGURES 11 and 13, the oil flow then initiated is from chamber 200 on the high pressure side of piston head 154 through orifice 192 and into the bore 166 of tubular piston rod 156, thence radially outwardly of the piston rod 156 through orifices or ports 204 of the tubular piston rod. As the hydraulic liquid within the tubular piston rod is displaced by the metering pin 164, it likewise moves through ports 204, as indicated by the arrows. Metering pin guide member 168 is formed with relatively large apertures 169 to permit a free flow of hydraulic liquid during movement of the metering pin.

The hydraulic liquid flow through ports 204 is under relatively high velocity and creates great turbulence in the chamber 206 that is formed by the space between tubular piston guide member 178 and piston head 154. This great turbulence is caused at least in part by the radially directed flow of hydraulic liquid impinging directly against the inner surface 167 of tubular cylinder 152, and is responsible for dissipation of much of the kinetic energy of the hydraulic liquid in the form of heat.

As the contraction of the cushion device 20 proceeds, the high pressure chamber 200 is reduced in volume by the advancement of the piston head 154 toward the tubular cylinder closure member 162. The hydraulic liquid passing through orifice 192 fills the chamber 206 behind the piston head 154, while a volume of hydraulic liquid equivalent to that displaced by the total entry into the fluid chamber of the piston rod 156, passes through apertures 208 of guide member 178 into the space 210 enclosed by the invaginating boot or tubular member 158 which inflates or expands and rolls to the position suggested by FIGURE 12. The apertures 208, as seen in FIGURE 13, are relatively large in cross-sectional area, which provides or permits a relatively large volume and consequently low pressure hydraulic liquid flow from chamber 206 to space 210. This avoids generation of any appreciable compressive force on the relatively slender metering pin and prevents any possibility of it buckling.

After the shock has been fully dissipated, compression springs 160, acting in tandem, return the hydraulic cushion components to the initial extended position of FIGURE 11. During this movement under the action of the compression springs, the oil flow illustrated in FIGURE 13 is reversed, and invaginating tubular member or boot 158 deflates and returns to the position of FIGURE 11, thereby insuring that the hydraulic liquid displaced by the piston rod 156 is restored to its normal operative locations.

The flanges 118 of angle members 116, sheet 112 and the bed of the car serve to guide the contraction and extension movement of the unit 20 and prevent it from jackknifing.

It will thus be seen that not only is the device 20 composed of few and simple components, and that all sliding or dynamic seals have been eliminated, but a reliable long travel cushioning action is provided. Furthermore, all kinetic energy applied to the cushion device is dissipated in the form of heat by the passing of the hydraulic liquid through orifice 192 and the turbulence in chamber 206, with the exception of the small potential energy stored in the return springs.

Reference may be had to said copending application Serial No. 782,786 for a more specific description of unit 20. It may be added, however, that the tapering surface 194 of the metering pin 164 extends between points 212 and 214 (see FIGURE 13), and that the contour of tapered surface 194 in the illustrated embodiment is designed from the relationship $$A_x = A_0 \sqrt{1 - \frac{x}{d}}$$

wherein $A_x$ is the orifice area of any position $x$ (see FIGURE 13) over the total nominal stroke $d$ (the length of the tapered surface 194), and $A_0$ is the initial orifice area defined by orifice 192 at the beginning of a stroke, in the case where a completely rigid body is being cushioned from impact. While in most cases this assumption will result in a reasonably efficient design, small alterations can be readily made to this shape to give a closer approach to the optimum constant force travel characteristic for a given situation after a few experimental trials. However, the shape given by the above formula is the best starting point. Furthermore, it is usually possible to obtain a reasonably efficient design by approximating the curved shape given by the above expression as by calculating a series of spaced cross-sectional areas of the pin 164 and connecting the cross-sectional areas so determined by straight tapers, if this facilitates manufacture. The orifice areas referred to are the orifice areas of orifice 192 minus the cross-sectional area of the metering pin at any given position along the stroke of the metering pin.

The components of the unit 20 may be formed from any suitable materials, boot 158 of the illustrated embodiments being formed from neoprene-Buna N type rubber with special additives for low temperature flexibility and clamps 182 and 186 being of the type of clamp sold under the trademark "Punch-Lok," made and sold by the Punch-Lok Company of Chicago, Illinois. The unit 20 of the illustrated embodiment is preferably charged with the high viscosity index oil sold by Shell Oil Company under the trade designation Aeroshell No. 4, as this oil desirably has a relatively small variation in viscosity between the extremes of minus 60 degrees F. and 150 degrees F.

The hydraulic liquid when the device 110 is in fully extended position is under very little pressure, perhaps no more than 2 p.s.i., but even though the pressure in the high pressure chamber 200 may rise to as much as 8,000 p.s.i. as when the device is employed in railroad cars to cushion buff and draft forces, the maximum pressure within the invaginating boot 158 (when fully inflated) is believed to be about 6 p.s.i. Boot 158 stretches about 100 percent when fully inflated. Units 20 can be designed for operating pressures up to the limit of the yield strength of cylinder 152 and the device of FIGURES 11–13 is capable of absorbing kinetic energy on the order of a million foot pounds, depending, of course, on the specific design required for a specific purpose. Units 20 will thus easily absorb 15 mile per hour impacts when applied to, for instance, the railroad cars A, though impacts of this magnitude would damage the car.

Lift structure

Referring now to FIGURES 5–8 and 10, the members 70 forming diagonal struts 30 each comprise a tubular member 240 that slidably receives the rod-like member 242. The tubular members 240 are closed at one end by a clevis member 244 which is received over the shaft 44 that secures the respective struts 30 to the fifth wheel plate structure 12. The rod-like members 242 are formed as at 246 (see FIGURE 10) to receive the respective shafts 34 and are provided with stop lugs or flanges 248 that limit the forward swinging movement of the fifth wheel stand when the ends 250 of tubular members 240 contact them. In this position, the holes or perforations 252 and 254 (see FIGURE 10) of the tubular member and rod-like member are aligned to receive pins 256 that comprise securing devices 72. Pins 256 may be secured to the respective struts 30 as by chains 258 welded to either member of the strut. Brace plates 260 may be fixed about perforations 252 of tubular member 240 for reinforcing purposes.

The struts 32 each comprise a channel member 264 in which the flanges 266 thereof are perforated at the ends of the strut to receive the respective shafts 40 and 44. Channel members 264 are preferably joined by appropriate tie plate 268 which is formed at its ends as at 270 to avoid interference with the cushion apparatus 16 and fifth wheel plate structure 12 during the raising and lowering of the fifth wheel stand.

It will thus be seen that the struts 30 are essentially prop forming devices, while the struts 32 form a simple lever device to swing the fifth wheel plate structure between raised and lowered positions. When the stand is in the position of FIGURE 2, the members 70 forming the respective struts 30 are in their positions of maximum extension as indicated in FIGURE 10, and in this position they lie between the flanges 266 of struts 32. While this arrangement permits the struts 30 and 32 to essentially telescope (transversely thereof) together in the lowered position of the stand to achieve a position of minimum elevation, a further lowering in the present invention is achieved by notching the rod-like members 242 of struts 30 as at 271 to receive the respective shafts 40 of the struts 32. Additionally, the shafts 40 are excised as at 272 to permit a still further lowering of the fifth wheel plate structure 12. It will be noted that the excised portions 272 of shafts 40 are disposed so that when struts 32 are in the upright position, the load will be transmitted to the respective shafts 40 lengthwise to their maximum cross-sectional dimension.

As indicated in FIGURE 10, the struts 30 rest on the respective shafts 40 when the stand is in its lowered position to hold the fifth wheel plate structure slightly above the car bed.

In the embodiment of FIGURES 14–19, the members 92 forming diagonal struts 90 each comprise a pair of telescoping channel members 280 and 282, the outer member 280 having its flanges 284 formed with appropriate perforations to receive the respective shafts 44 that pivot the struts 90 to fifth wheel plate structure 12. The inner channel members 282 are fixed to clevis members 286 that are formed as at 288 to receive the respective cushioning apparatus shafts 34, while the flanges 284 of channel members 280 are perforated to receive the respective shafts 44. As indicated in FIGURE 17, the edges of flanges 284 of channel member 280 are provided with slide bars 289 on which the flanges 290 of inner channel member 282 ride to hold these channel members in sliding relation. Slide bars 289 extend the length of the respective channel members 280 and may be fixed in place as by welding. Several latching devices 96 may be employed to secure members 280 and 282 in contracted relation.

The flanges 284 of the outer member 280 are notched as at 293, and flanges 290 of inner member 282 are notched as at 293A to receive the respective shafts 40 that secure the vertical struts 94 to the cushioning apparatus in the retracted position of stand 95, similar to the function of notches 271 of stand 10. Notches 293 and 293A should be located so that they will be aligned transversely of the car in the retracted position of stand 95. Channel members 282 are provided with flanges 243a against which channel members 280 abut in the retracted position of FIGURE 15.

The tubular members 98 of vertical struts 94 are secured to clevis members 294 that receive the respective shafts 44 of the fifth wheel plate structure 12. The rod-like members 100 are appropriately formed as at 296 to receive the respective shafts 40 and are threaded as at 298 for engagement with the flanged nut 104. The nut 104 is turned up to bring flange 300 against flange 302 of tubular member 98 when the fifth wheel stand plate structure has been brought against the undersurface of a trailer F; clamping device 106 is then applied to flanges 300 and 302 after which the stand can be fully elevated to lift a trailer off its landing gear.

Clamping device 106 comprises a pair of C-shaped members 304 and 306 pivoted at like ends as at 308 and form with perforations 310 at their other ends to receive a suitable pin 312 for securing the members 304 and 306 about flanges 300 and 302. Flanges 304 and 306 are recessed as at 314 to receive the respective flanges 300 and 302. The pins 312 may be secured to the respective struts 94 by appropriate chains 316 having one end welded to the member 98 and the other end secured to the pin 312.

The stand 95 employes the fifth wheel plate structure 12 and the cushioning apparatus 16. Members 280 and 282 of struts 90 should be proportioned to engage over the respective struts 94, including latching devices 106 when the stand 95 is in the lowered inoperative position of FIGURE 14. Prior to lowering stand 95 to its fully retracted position, nuts 104 should be turned toward the respective shafts 40 to provide the play necessary to accommodate trailers of lesser height above the car bed.

Fifth wheel plate structure

The surfaces 50 of fifth wheel plate 48 define a kingpin indexing space 320 which converges in the direction of coupler jaw 52. The surfaces 50 merge into relatively closely spaced surfaces 320 which terminate in a rounded surface 322 (surfaces 320 and 322 are indicated in dashed lines in FIGURE 20) under which the coupler jaw notch 54 is positioned in its latching position. The curved abutment 80 is fixed to the undersurface of the plate 48 by appropriate bolts 324, as is a corresponding abutment 326 on the other side of the coupler jaw 52. Abutments 80 and 326 may be provided with dowel pins 328 that are received in appropriate holes 329 (one of which is shown in FIGURE 27) formed in the plate 48 for properly locating same in assembly of the fifth wheel plate structure. As best seen in FIGURE 24, the coupler jaw 52 is generally circular or round in configuration except for the indentations defined by notches 54, 76 and 78. The jaw 52 may be in the form of integrally united lands 330 and ridges 332 for maximum strength. Notches 76 and 78 are connected with a cam surface 334 over which the plunger 56 rides during application of the kingpin to the coupler jaw. As indicated in FIGURES 24 and 25, the upper surface of the coupler jaw about notch 54 may be provided with a hardened reinforcing U-shaped member 336.

The curve of abutments 80 and 326 is complementary to the peripheral surface 338 of the coupler jaw, the coupler jaw being mounted between abutments 80 and 326 by the coupler jaw retaining plate 340 that is secured in place by the bolts 324, which pass through appropriate holes 342 formed in plate 340, and are screw-threadedly received in fifth wheel plate 48. Retainer plate 340 is formed with surfaces 320a and 322a that correspond to surface 320 and 322 of fifth wheel plate 48.

The lugs 46 have the configuration best shown in FIGURE 21 and are thus generally L-shaped in configuration including a stem portion 350 and widened portion 352 which is perforated as at 354 to receive the respective shafts 44 (shafts 44 may be held against movement axially thereof in any suitable manner, as by employing conventional snap ring (not shown) received in grooves formed adjacent the ends of the respective shafts 44). The lugs 46 may be secured to the undersurface of plate 48 in any suitable manner, as by welding, and are preferably spaced approximately as indicated in FIGURE 20. The stem portions 350 of lugs 48 are preferably tied or joined together by tie plate 356 that forms the rear wall 358 of the fifth wheel plate structure. The tie plate 356 in addition to the wall 358 includes extensions 360 at each side of the stand; each extension is provided with angled ends 362, and both the extensions 360 and angled ends 362 may be welded to the respective lugs 46.

The movement of plunger 56 is guided by spaced guide bars 364 and 366 (see FIGURE 24) which are fixed against plate 48 in any suitable manner, as by welding, in the positions indicated in FIGURE 24 (extension 367 of retaining plate 340 being secured to the respective bars 364 and 366 by appropriate bolts 369). The plunger 56 generally comprises a tubular member 370 formed as at 372 to fixedly receive guide rod 374 which also slidably extends through perforation 376 formed in the rear wall 358. A suitable compression spring 378 is interposed between abutment 380 fixed to the rear wall 358 and the end 382 of plunger 56. Spring 378 thus biases the plunger 56 against the coupler jaw 52.

As best seen in FIGURE 27, the plunger 56 fixedly carries a pin 390 which is received through handle bar 392 forming the handle 58. The pin 390 operates in slot 394 of coupler jaw retainer plate 340 and castle nut 396, secured in place by appropriate cotter pin 398, holds the handle bar 392 in place. Suitable washers 400 may be applied where shown in FIGURE 27.

The inner end 402 of the handle bar 392 is pivoted to threaded pin 404 (see FIGURE 26) that extends downwardly from abutment 80, castle nut 406, threaded on pin 404 (that is fixed in abutment 80) and held in place by appropriate cotter pin 408, holds handle bar end 402 in place, appropriate washers 410 being applied to pin 404 if so desired.

As best seen in FIGURE 26, the handle bar 392 extends laterally of the fifth wheel stand plate 48 and outwardly through elongated slot 412 formed in catch plate 414 that is secured in any suitable manner to the adjacent lug 46 and rear wall 358 as by bolts 416 or welding.

Figure 22:
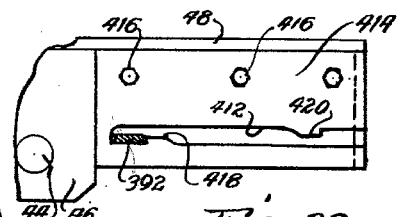
FIGURE 22 is an elevational view taken approximately along line 22—22 of FIGURE 20.
Figure 23:
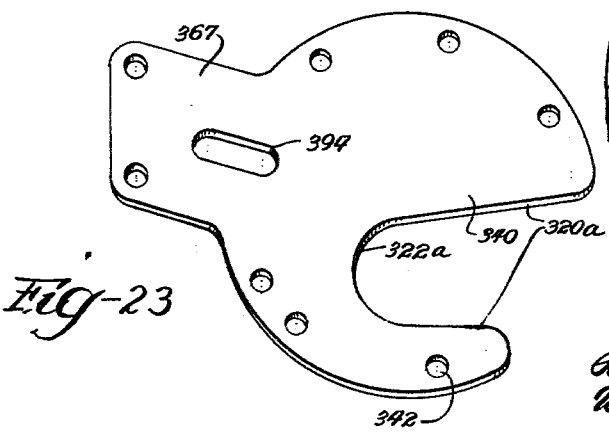
FIGURE 23 is a perspective view of a plate employed to secure the coupler jaw shown in FIGURE 20 to the fifth wheel plate structure.

The catch plate 414 is provided with spaced lugs 418 and 420 (see FIGURE 22) which hold the handle bar in its extreme positions. When the handle bar is behind lug 418, the plunger 56 will be drawn tightly into notch 78, while when the handle bar 392 is positioned behind notch 420, the plunger 56 is withdrawn for positioning in notch 76.

The relationship of the shape of notch 54 and the trailer kingpin is indicated in FIGURE 25 wherein it will be seen that jaw 54 includes an internal shoulder 422 that is complementary to the shape of the kingpin. When the coupler jaw 52 is positioned as indicated in FIGURE 20, the abutment 80 will close notch 54.

When the fifth wheel stand 10 or 95 is to be initially applied to a trailer kingpin 62, the handle bar 392 is manipulated to free the coupler jaw 52 which is then moved by hand to position it as shown in FIGURE 24. This will require that the handle bar 392 be freed of lug 418 and drawn to the left of FIGURE 20 as far as necessary to withdraw plunger 56 sufficiently to permit jaw 52 to be rotated. This will position handle bar 392 approximately underneath lug 420, after which the handle is released to position plunger 52 in coupler jaw notch 76. As the fifth wheel plate structure is drawn against the kingpin, the kingpin turns the coupler jaw to the position of FIGURE 20 and plunger 56 rides over cam surface 334 and into notch 78, moving handle bar 392 over and behind lug 418 of catch plate 14 (the position of FIGURE 22). This holds the coupler jaw in locked position until release of the kingpin is desired, at which time the handle bar 392 is moved upwardly and over lug 418 and to the right of FIGURE 22 behind lug 420. This moves plunger 56 completely out of notch 78 so that when the fifth wheel stand is lowered, the relative movement between the fifth wheel plate structure and the kingpin will move the coupler jaw 52 back to the position of FIGURE 24. After the fifth wheel stand is lowered to its inoperative position, the handle bar 392 is removed from behind lugs 420 so that plunger 56 will enter notch 76 under the action of spring 318. The fifth wheel stand locking device is thus automatically positioned to again receive a trailer kingpin and lock same as described above.

Fifth wheel plate structure 12 is preferably proportioned so that its weight forwardly of shafts 44 sufficiently exceeds its weight rearwardly thereof to insure a proper balancing with the force applied by chain 64 whereby the fifth wheel plate structure is maintained substantially horizontally disposed while being moved between operative and inoperative positions.

Advantages of invention

It will therefore be seen that we have not only provided a simplified fifth wheel stand structure, but we have also made provision for protecting lading against damage previously caused by buff and draft impacts.

The fifth wheel stand structure relies on the simplified lever forming struts 32 to raise and lower it to elevated position under the motive action of the trailer tractor or other motor vehicle. The prop forming struts 30 securely fix the stand in elevated position and permit easy swinging movement from between lowered and elevated positions.

The simplified kingpin latching device is effective for application to all standard trailers, the surfaces 50 providing a practical tolerance for positioning the trailer with respect to the fifth wheel stand. As the coupler jaw 52 is not journalled or pivoted on a centrally disposed pin but abuts against the rounded elongate abutments 80 and 326, thrust forces applied against it are readily absorbed without damage to any operating component. The shape of the coupler jaw notch 54, the plunger 56 and the positioning of the abutment 80 insures that the coupler jaw will securely hold the trailer kingpin in locked position against all longitudinal and sidewise thrust as well as up and down thrusts.

The relatively light weight and simplified fifth wheel plate and lift structures are to a large extent made possible by the long travel cushion apparatus 16, which effectively transfers and dissipates kinetic energy applied to the stand on impacts up to 15 miles an hour (which are greater than what conventional railroad cars are designed to withstand).

The lift structure arrangement of FIGURES 14–19 has the distinct advantage of accommodating the fifth wheel stand to different trailer kingpin heights without the necessity of pre-adjustment or bringing the trailer to some standard or predetermined height.

While our invention has been disclosed as applied to the piggy back system of freight handling, it is equally applicable to other freight handling systems requiring fifth wheel stands. The lift structure and the fifth wheel plate structure hereindisclosed may be employed without the cushioning assembly 16 by pivoting struts 30 and 32 directly to the car bed. However, in such instances, the car employed preferably is designed to transfer and dissipate impact shocks in accordance with the invention described in said application Serial No. 797,529 and Peterson Patent 3,003,436.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:

1. A fifth wheel stand for railroad cars comprising, in combination with the car, a lift structure, a fifth wheel plate structure carried by said lift structure, and cushion means interposed between said lift structure and the railroad car for cushioning buff and draft forces applied to the railroad car, said cushion means including a traveling component adapted to move longitudinally of the car under the cushioning action of said cushion means, said lift structure comprising, a first strut pivotally secured at one end thereof to said traveling component, a second strut pivotally secured at one end thereof to said traveling component at a point spaced longitudinally of the car from the pivotal connection of said first strut, means for pivotally securing said struts together adjacent the other ends thereof, said fifth wheel plate structure being operatively secured to at least one of said struts adjacent said other end thereof, said first strut comprising an extensible and contractible member, and means for locking said first strut in contracted relation, said second strut serving as lever means for swinging said plate structure along an arcuate path between a lowered inoperative position and an elevated operative position, said first strut when locked in contracted relation holding said plate structure in its elevated position.

2. The fifth wheel stand set forth in claim 1 wherein said first strut overlies said second strut in the lowered inoperative position of said plate structure, one of said struts being recessed to receive the other of said struts.

3. The fifth wheel stand set forth in claim 2 including shaft means pivoting said one end of said second strut to said cushion means traveling component, said struts being coplanar longitudinally of the car, said shaft means and said first strut being formed with interengaging notch means to achieve an inoperative position of minimum elevation.

4. A fifth wheel stand for railroad cars comprising, in combination with the car, a lift structure, a fifth wheel plate structure carried by said lift structure, trunnion means securing said plate structure to said lift structure, and cushion means interposed between said lift structure and the railroad car for cushioning buff and draft forces applied to the railroad car, said cushion means including a traveling component adapted to move longitudinally of the car under the cushioning action of said cushion means, said lift structure comprising, a diagonal strut structure pivotally secured at one end thereof to said traveling component, a vertical strut structure pivotally secured at one end thereof to said traveling component at a point spaced longitudinally of the car from the pivotal connection of said diagonal strut structure, said trunnion means securing the other ends of said strut structures to said fifth wheel plate structure, said diagonal strut structure comprising an extensible and contractible member, and means for locking said diagonal strut structure in contracted relation, said vertical strut structure serving as lever means for swinging said plate structure along an arcuate path between a lowered inoperative position and an elevated operative position, said diagonal strut structure when locked in contracted relation holding said plate structure in its elevated position, said diagonal strut structure being in extended relation and said strut structure being substantially horizontally disposed when said plate structure is in its lowered inoperative position, said cushion means comprising a hydraulic cushioning device including a tubular cylinder, a piston including a tubular piston rod reciprocably mounted in said tubular cylinder for movement toward and away from one end of said tubular member, said piston rod extending away from one end of said tubular cylinder, a metering pin carried by said tubular cylinder adjacent said one end thereof, said piston being formed with an orifice to receive said metering pin, said orifice and said metering pin being aligned with the bore of said tubular piston rod, said tubular cylinder and said bore of said piston rod being charged with hydraulic liquid, and resilient means for biasing said piston and piston rod away from said one end of said tubular cylinder, spaced lug means fixed to the railroad car, said tubular member and said piston and piston rod being interposed between said lug means, said traveling component of said cushion means carrying follower means respectively engaging said tubular cylinder.

5. A fifth wheel stand for railroad cars of the type that is to be raised and lowered by a motor vehicle, comprising, in combination with the car, a fifth wheel plate structure composed essentially of a fifth wheel plate and latching means for engaging the kingpin of trailers or the like that are to be transported by the railroad car, a lift structure for the fifth wheel plate structure, and cushion means interposed between said lift structure and the railroad car for cushioning buff and draft forces applied to the railroad car, said cushion means including a traveling component adapted to move longitudinally of the car under the cushioning action of said cushion means, said lift structure comprising a lever forming strut and a prop forming strut, said prop forming strut being extensible and contractible, means for releasably locking said prop forming strut in contracted relation, said struts being pivotally secured at like ends to said traveling component at points spaced from each other longitudinally of the car, said prop forming strut when locked in contracted relation holding said plate structure in its elevated operative position, said prop forming strut being in extended relation and said lever forming strut being substantially horizontally disposed when said plate structure is in its lowered inoperative position, whereby, said fifth wheel plate structure may be elevated by swinging said lever forming strut to a substantially upright position under the motive action of the motor vehicle and said prop forming strut locking means may be applied to hold said lever forming strut in said upright position.

6. A fifth wheel stand for railroad cars comprising, in combination with the car, a lift structure, a fifth wheel plate structure carried by said lift structure, and cushion means interposed between said lift structure and the railroad car for cushioning buff and draft forces applied to the railroad car, said cushion means including a traveling component adapted to move longitudinally of the car under the cushioning action of said cushion means, a trackway supported by the car and extending along each side of said cushion means, said lift structure comprising, a first pair of struts positioned on either side of said cushion means having like ends pivotally secured to roller means mounted in the respective trackways, a second pair of struts positioned on either side of said cushion means and having like ends pivotally secured to roller means mounted in the respective trackways, said roller means of each trackway being secured to said travelling component in spaced apart relation, the other ends of said struts being pivotally secured to said fifth wheel plate structure, the struts of said first pair of struts each comprising an extensible and contractible member, and means for locking said members in contracted relation, said second pair of struts serving as lever means for swinging said plate structure along an arcuate path between a lowered inoperative position and an elevated operative position, said first pair of struts, when locked in their contracted positions, holding said plate structure in its elevated position.

References Cited by the Examiner

UNITED STATES PATENTS

| | | | |
|---|---|---|---|
| 2,036,344 | 4/36 | Menhall | 105—368 |
| 2,099,288 | 11/37 | Allen | 105—368 |
| 2,144,243 | 1/39 | Fraser et al. | 280—434 |
| 2,305,444 | 12/42 | Pond | 105—368 |
| 2,459,772 | 1/49 | Kinne | 280—434 |
| 2,517,183 | 8/50 | Dunn et al. | 248—240.3 |
| 2,880,681 | 4/59 | Markestein et al. | 105—368 |

OTHER REFERENCES

A.C.F. Retractable Trailer-Hitch, article published in Railway Age, Nov. 12, 1956, pages 17–20.

LEO QUACKENBUSH, *Primary Examiner.*

JAMES S. SHANK, *Examiner.*

UNITED STATES PATENT OFFICE
CERTIFICATE OF CORRECTION

Patent No. 3,181,480

May 4, 1965

Robert M. Sherrie et al.

It is hereby certified that error appears in the above numbered patent requiring correction and that the said Letters Patent should read as corrected below.

Column 2, line 59, for "smaller" read -- similar --; column 8, lines 62 and 63, for "embodiments" read -- embodiment --; column 14, line 52, after "car," insert -- means for pivotally securing said struts together adjacent the other ends thereof, said fifth wheel plate structure being operatively secured to at least one of said struts adjacent said one end thereof, --.

Signed and sealed this 28th day of September 1965.

(SEAL)
Attest:

ERNEST W. SWIDER
Attesting Officer

EDWARD J. BRENNER
Commissioner of Patents